United States Patent [19]

Morlan

[11] Patent Number: 5,499,542

[45] Date of Patent: Mar. 19, 1996

[54] DIAMETRAL FORCE SENSOR

[75] Inventor: David E. Morlan, Marietta, Ga.

[73] Assignee: Westinghouse Electric Corporation, Pittsburgh, Pa.

[21] Appl. No.: 231,087

[22] Filed: Apr. 22, 1994

[51] Int. Cl.⁶ ..................................................... G01L 1/26
[52] U.S. Cl. ........................................ 73/818; 73/862.621
[58] Field of Search .............................. 73/818, 831, 856, 73/833, 859, 790, 760, 862.621, 862.627, 795; 33/788

[56] References Cited

U.S. PATENT DOCUMENTS

| | | | |
|---|---|---|---|
| 3,210,993 | 10/1965 | Shoor et al. | 73/818 |
| 4,527,335 | 7/1985 | Meline | 33/787 |
| 4,542,649 | 9/1985 | Charbonneau et al. | 73/168 |
| 4,911,004 | 3/1990 | Leon | 73/168 |
| 4,930,228 | 6/1990 | Anderson et al. | 33/788 |
| 4,936,150 | 6/1990 | Burke et al. | 33/788 |
| 5,103,681 | 4/1992 | Duff | 73/862.54 |
| 5,123,283 | 6/1992 | Duff et al. | 73/760 |

FOREIGN PATENT DOCUMENTS

| | | | |
|---|---|---|---|
| 372348 | 3/1973 | U.S.S.R. | 73/818 |
| 9105266 | 4/1991 | WIPO | 73/818 |

*Primary Examiner*—Richard Chilcot
*Assistant Examiner*—Jewel V. Artis
*Attorney, Agent, or Firm*—David G. Maire

[57] ABSTRACT

Disclosed is a device for determining the diametral changes in a substantially cylindrical member produced by axial loads imposed on the cylindrical member, such as the valve stem in a motor operated valve assembly. The device is a clamp assembly comprised of a first jaw member and a second jaw member rigidly connected to each other and to the portions of the periphery of the cylindrical member by a pair of studs. The second jaw member has a flexure with a contact surface contacting a peripheral portion of the cylindrical member and a projection extending away from the contact surface to transmit compressive forces representative of diametral changes in the cylindrical member against a compression load cell housed in the second jaw member. The device is useful in the field of valve diagnostics.

13 Claims, 2 Drawing Sheets

DIAMETRAL FORCE SENSOR

BACKGROUND OF THE INVENTION

This invention relates to an improved device for measuring diametral changes in a substantially cylindrical member. It relates particularly to a device for measuring slight diametral changes in a substantially cylindrical member, such as a valve stem, that can be used for determining the axial loading on the substantially cylindrical member.

In many industries it is important to measure the variable dynamic axial loads that may be imposed on a cylindrical member or shaft. This is especially true in the nuclear power industry where motor operated valves are used extensively and monitoring of the various operating parameters of the valves are required by regulatory agencies. Motor operated valves are comprised generally of an electric motor driven valve actuator that is connected to a valve stem and a valve yoke that partially surrounds the valve stem. Rotation of a nut attached to the valve stem by the valve actuator will move a valve plug into a closed, open or intermediate position with respect to a valve seat in the body of the valve.

It has been found that one of the best ways to monitor the dynamic forces and events that occur during the operation of a motor operated valve is by direct measurement of the valve stem axial loads using either axial or diametral strain gages.

It is well known that one can calculate the axial load or strain in a valve stem or any other similar substantially cylindrical member, by measuring changes in the diameter of the valve stem or cylindrical member. The ratio of the diametral change to axial elongation for a material, referred to as Poisson's ratio, is known. Therefore, by measuring the diametral change on the valve stem or cylindrical member, axial strain and valve stem axial load can be easily determined.

U.S. Pat. Nos. 4,911,004; 4,930,228; 4,936,150 and 5,123,283 describe several prior devices and systems that have been developed for measuring axial strains in a valve stem or similar cylindrical member.

Some of these prior devices were a clamp type of strain gage that used two clamp assemblies to attempt to define a reference gage length axially along the valve stem. Such devices were usually expensive, comprised of many parts and often difficult to mount on the exposed portion of a valve stem.

Many of the other prior devices designed as clamps to fit around an exposed portion of the valve stem or cylindrical member to measure diametral strains were usually designed so that any diametral strains in the valve stem would cause the clamp to deflect. This clamp deflection was then measured and calibrated to diametric strains. The measurement of clamp deflection however, requires the device to be flexible enough to provide a reasonable level of output signals. However, the flexible nature of these devices often led to undesirable and erroneous output signals due to the torsional loads that are also applied to the valve stem during operation of the valve. Many of these prior devices were not able to distinguish strains induced in the valve stem due to torsional loads from those induced in the valve stem through axial loads and thrust.

SUMMARY OF THE INVENTION

It is therefore an object of this invention to provide a device for determining diametral changes in a valve stem or other cylindrical member that is simple, relatively inexpensive and easily installed on commercial motor operated valves.

It is another object of this invention to provide a device for determining diametral changes in a valve stem or other cylindrical member that is able to provide direct and continuous measurements of the axial loads on a movable valve stem.

It is another object of this invention to provide a device for determining diametral changes in a valve stem or other cylindrical member that is quite accurate and not subject to errors caused by torsional loads or off-center axial loads on the valve stem.

These and other objects of this invention can be attained by a device for determining the diametral changes in a cylindrical member produced by axial loads imposed on the cylindrical member, comprising a clamp assembly having a first jaw member and a second jaw member which are rigidly connected to each other on opposite sides of the cylindrical member. The first jaw member has a substantially V-shaped recess adapted to engage two peripheral portions of the cylindrical member. The second jaw member has a flexure with a contact surface contacting a peripheral portion of the cylindrical member and a projection extending away from the contact surface to provide the transmittal of compressive forces representative of diametral changes in the cylindrical member against a compression load cell contained within the second jaw member.

DESCRIPTION OF THE PREFERRED EMBODIMENTS

Figure 1:
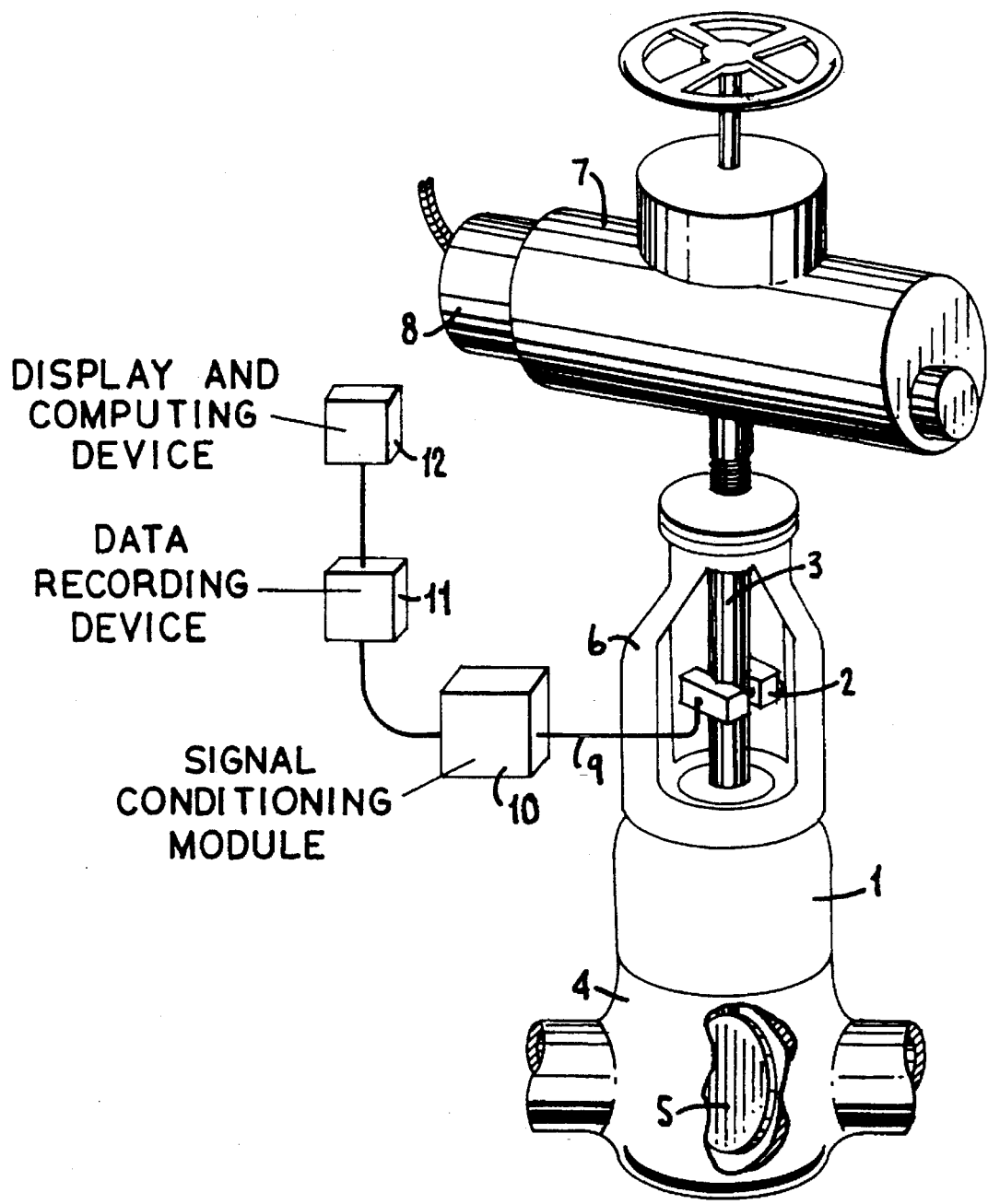
FIG. 1 is an isometric view of a typical motor operated valve assembly, partly in section, to illustrate the installation of the diametral force sensor of this invention on the cylindrical valve stem of the valve assembly.

FIG. 1 is an isometric view of a typical motor operated valve assembly 1, partly in section, to illustrate the installation of the diametral force sensor 2 of this invention on the cylindrical valve stem 3 of the valve assembly 1. The valve assembly 1, generally is comprised of a valve body 4 which contains a valve plug or gate 5, operated to a closed, open or intermediate position with respect to a valve seat by the valve stem 3. The valve stem 3 is partially enclosed by a valve yoke 6 which supports a valve actuator 7 operated by an electric motor 8.

As shown in FIG. 1, the diametral force sensor 2 of this invention is clamped around the valve stem 3. The diametral force sensor 2 has an electrical cable 9 leading from the diametral force sensor 2 to an electrical signal conditioning module 10, a data recording device 11, such as a computer disk, and a computing and display device 12, such as a personal computer.

Figure 2:
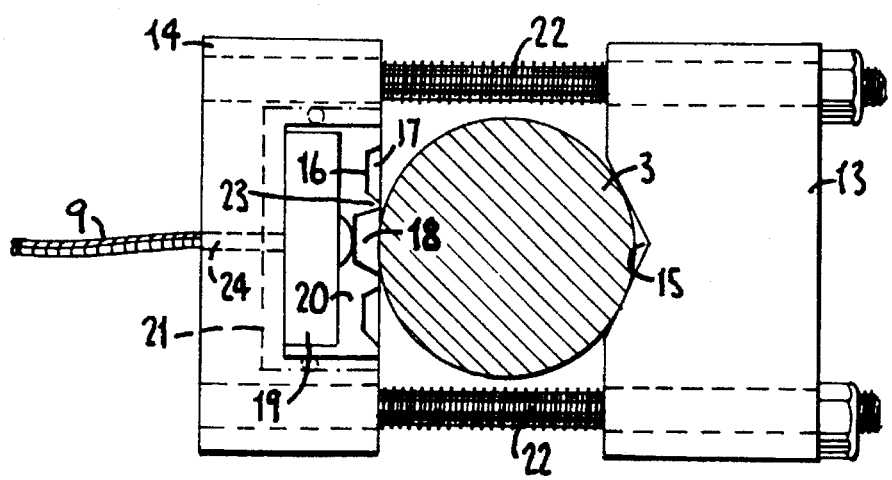
FIG. 2 is a top view, partly in section, illustrating the preferred embodiment of the diametral force sensor of this invention mounted on a cylindrical valve stem.
Figure 3:
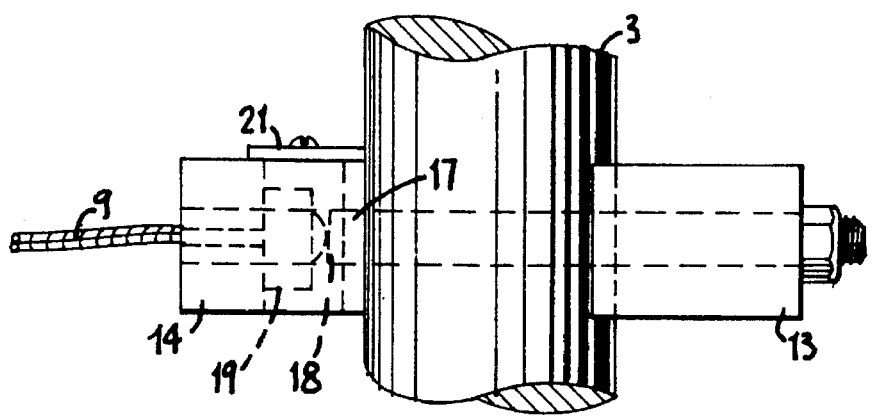
FIG. 3 is an elevational view illustrating the preferred embodiment of the diametral force sensor of this invention mounted on a cylindrical valve stem.

As shown in FIGS. 2 and 3, the preferred embodiment of the diametral force sensor 2 of this invention is a clamp assembly comprised of a first jaw member 13 and a second jaw member 14 rigidly connected to each other and to the valve stem 3 on opposite sides of the valve stem 3. The jaw members 13 and 14 are preferably made of steel and joined together by a pair of steel studs 22.

The first jaw member 13 has a substantially V-shaped recess 15 adapted to engage two peripheral portions of the valve stem 2. The second jaw member 14 has a relatively thin flexure 16, having a contact face or surface 17 that contacts another peripheral portion of the valve stem 3 and a projection 18 that extends away from the planar face or surface 17. If desired, the rear face of the flexure 16 is provided with several spaced shallow grooves 23 designed to control the flexing of the flexure 16 resulting from the diametral changes in the valve stem 3. The projection 18 is designed to transmit compressive forces from the back of the flexure 16 to a compression load cell 19 contained in a recess 20 formed in the second jaw member 14. A removable cover plate 21, covers the recess 20 to retain and protect the load cell 19. The second jaw member 14 is also provided with a wiring port 24 to permit the electrical cable 9 connecting the load cell 19 and the signal conditioning module 10 to exit the rear of the second jaw member 14.

A suitable load cell as used in the preferred embodiment of this invention is a Model No. 53 compression load cell manufactured by Sensotec Corporation.

In operation, the diametral force sensor 2 of this invention is clamped around the valve stem 3 and connected electrically by the electrical cable 9 to the signal conditioning module and the data recording device 11 and the computing and display device 12.

As mentioned earlier, prior valve stem clamp-like sensors that measured the diametral strains were designed so that the diametral strains would cause the clamp to deflect. this deflection of the clamp was then related to the diametral strain but also required that the clamp-like sensor be flexible. These flexible sensors led to errors due to torsional loads also imposed on the valve stem by the valve actuator or components of the valve assembly.

The diametral force sensor of the present invention uses a rigid rather than a flexible clamp and an internal compression load cell that measures directly any increase in the clamping forces due to a "swelling" or enlargement of the diameter of the valve stem due to both axial and torsional loads. The very rigid nature of the present diametral force sensor of this invention minimizes any distortion caused by torsional forces and therefore minimizes any torque induced errors. Unlike the prior known sensors, the output level of the signals from the sensor of the present invention increases as the clamp gets stiffer.

The preferred embodiment of this invention uses the flexure 16 positioned between the load cell 19 and the valve stem 3 to prevent errors due to "off center" loads applied by the valve stem 3 to the load cell 19. Without the flexure 16, off center loads could be imparted to the load cell 19 if it was connected directly to the valve stem 3. The flexure prevents errors caused by any such off center loads.

As described above, the electrical change in voltage signals produced by the load cell 19 are transmitted by the electrical cable 9 to the signal conditioning module 10 that converts these electrical signals to a digital form for output, computations and display at the computing and display device 12 and recording in the data recording device 11, which will provide a record of the loads on the valve stem 3 under a variety of test or operating conditions for further study and analysis.

The computing and display device 12, such as a personal computer, is easily able to compute the actual axial forces in the valve stem 3 using Hooke's Law and Poisson's ratio. For a column, such as the valve stem 3, subjected to an axial force the axial strain or change in length can be related to the applied force using Hooke's Law.

Delta L=(F*L)/(A*E)

Where: Delta L=change in length (inches)

F=axial load (pounds)

L=gage length (inches)

A=cross sectional area (square inches)

E=Young's Modulus (psi.)

The axial strain discussed above is accompanied by a lateral strain reflected in a change in cross section dimensions of the valve stem which can be related to the axial force or load applied using Poisson's ratio and Hooke's Law Delta d=(V*D*F)/(A*E)

Where: Delta d=change in lateral dimension (inches)

V=Poisson' ratio for material

D=lateral dimension (inches)

F=axial force applied (pounds)

A=cross sectional area (square inches)

E=Young's Modulus (psi.)

It is believed that the present invention and its advantages will be understood from the above description and the accompanying drawings and it will be apparent that changes may be made in the form, construction and arrangement as described without departing from the scope of this invention.

I claim:

1. A device for determining the diametral changes in a substantially cylindrical member produced by axial loads imposed on the cylindrical member, comprising a clamp assembly having a first jaw member and a second jaw member rigidly connected to each other on opposite sides of the cylindrical member, the first jaw member having a substantially V-shaped recess adapted to engage two peripheral portions of the cylindrical member, the second jaw member having a flexure with a contact surface contacting a peripheral portion of the cylindrical member and a projection extending away from the contact surface to provide the transmittal of compressive forces representative of diametral changes in the cylindrical member against a compression load cell contained within the second jaw member.

2. The device of claim 1 in which the cylindrical member is a valve stem of a valve assembly.

3. The device of claim 1 in which the load cell is contained within a recess in the second jaw member.

4. The device of claim 3 in which the load cell is retained in the recess by a removable cover plate.

5. The device of claim 1 in which the load cell provides electrical signals representative of diametral changes in the cylindrical member to computing and display means used for determining the axial loading on the cylindrical member from the electrical signals.

6. The device of claim 1 in the flexure is provided with a plurality of grooves.

7. The device of claim 1 in which the jaws are connected to each other with a pair of studs.

8. The device of claim 1 in which the load cell is connected electrically to transmit electrical signals representative of diametral changes in the cylindrical member to a signal conditioning module, an output signal computing and display device and an output signal data recording device.

9. The device of claim 1 in which the clamp assembly is adapted to accommodate cylindrical members of different diameters.

10. A device for measuring the diametral changes in a valve stem produced by axial loads imposed on the valve stem, comprising:

a rigid clamp assembly comprising a first jaw member having a first contact face and a second jaw member having a second contact face;

a compression load cell connected to said second contact face;

wherein said rigid clamp assembly is adapted to be rigidly clamped around said valve stem so that said first contact face exerts a clamping force against a first portion of said valve stem, and said compression load cell contacts a second portion of said valve stem opposed said first portion of said valve stem, and wherein said compression load cell measures directly any change in said clamping force caused by a change in diameter of said valve stem.

11. The device of claim 10, further comprising a flexure positioned between said compression load cell and said second contact face.

12. The device of claim 11, wherein said flexure comprises a contact face for contacting said valve stem and a projection extending away from said contact face in contact with said compression load cell.

13. The device of claim 10, further comprising a computing and display device connected to said compression load cell.

\* \* \* \* \*